United States Patent [19]
Nagel

[11] Patent Number: 5,842,393
[45] Date of Patent: Dec. 1, 1998

[54] MACHINE TOOL

[76] Inventor: Peter Nagel, Schulstrasse 14, D-59909 Bestwig-Ramsbeck, Germany

[21] Appl. No.: 785,608

[22] Filed: Jan. 17, 1997

[30] Foreign Application Priority Data

Jan. 20, 1996 [DE] Germany ................. 196 02 003.4

[51] Int. Cl.$^6$ ..................................... B23B 15/00
[52] U.S. Cl. ..................... 82/129; 82/124; 29/36
[58] Field of Search ................. 82/129, 121, 124; 29/36, 39, 41

[56] References Cited

U.S. PATENT DOCUMENTS

| | | | |
|---|---|---|---|
| 4,612,690 | 9/1986 | Baker | 29/33 |
| 5,313,861 | 5/1994 | Ikeda | 82/129 |
| 5,514,061 | 5/1996 | Ito | 82/124 |
| 5,655,423 | 8/1997 | Nishio | 82/1.11 |

FOREIGN PATENT DOCUMENTS 38 44 423  6/1990  Germany .

*Primary Examiner*—Andrea L. Pitts
*Assistant Examiner*—Mark Williams
*Attorney, Agent, or Firm*—Young & Thompson

[57] ABSTRACT

To machine coarse base material and to finish-turn the preturned blank, first the coarse base material is held in spindle (1) of stationary headstock (2). Then the coarse base material is preturned with first tool slide (3). The work preturned in this way is thereupon picked off by pick-off spindle (7) and the work now sitting in pick-off spindle (7) is cut off with a cropper on first tool slide (3). The back of the preturned work and inside diameter are machined by second tool slide (9), and for finishing of the work in the outer area and on the end face it is picked up by another spindle (10).

6 Claims, 1 Drawing Sheet

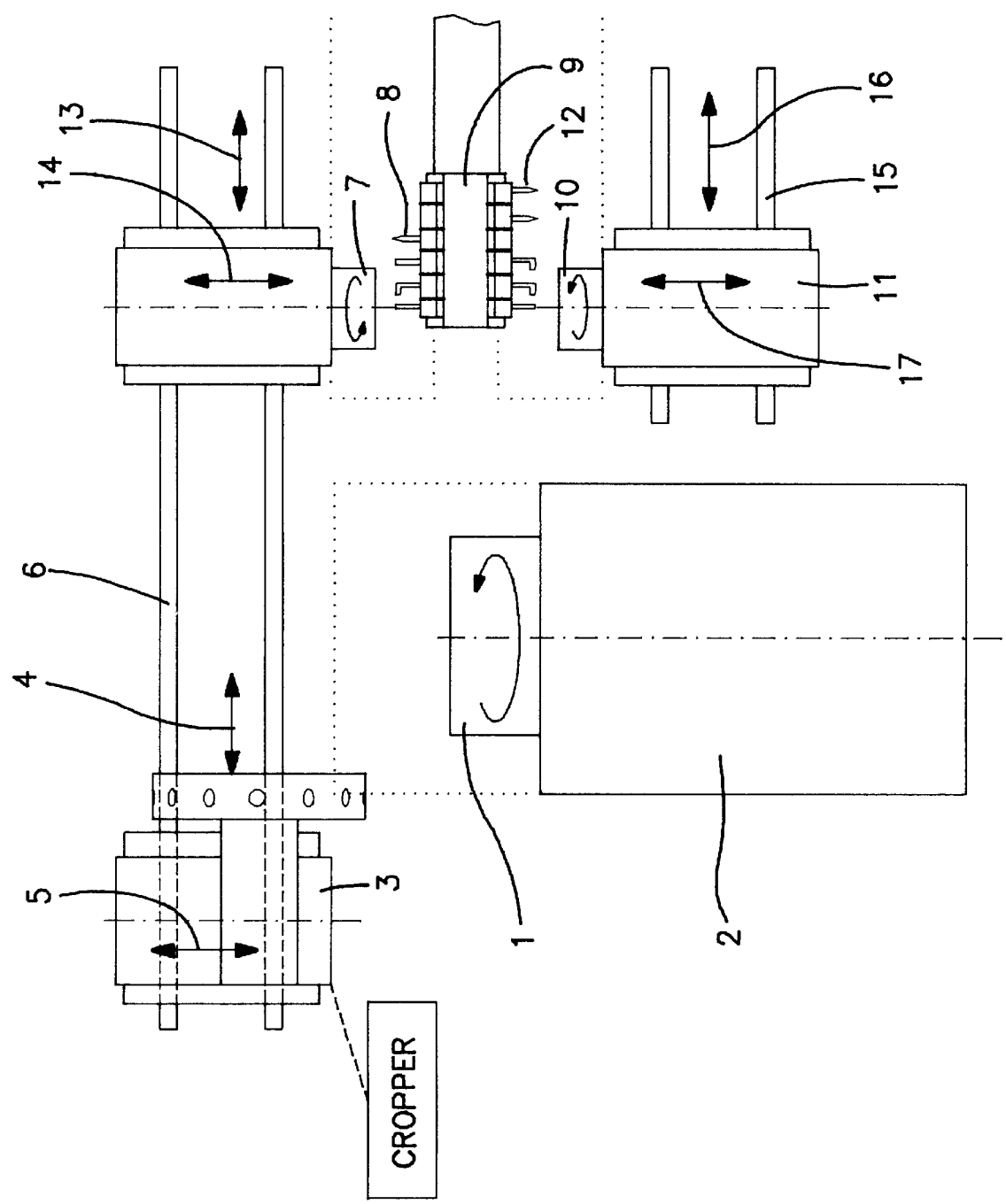

MACHINE TOOL

FIELD OF THE INVENTION

The invention relates to a machine tool for machining coarse base material and for finish-turning of a preturned blank.

BACKGROUND OF THE INVENTION

High cutting speeds are required for finishing of modern materials. Since coarse materials of the most varied wall thicknesses produce unbalanced masses at high rpm due to their lack of balance, it is necessary to preturn the coarse material at low rpm. The coarse material can be cast or rolled or preformed in some other way.

SUMMARY OF THE INVENTION

The object of the invention is to devise a machine tool with which workpieces of coarse material can be automatically finished up to microfinishing.

In terms of the process, achieving the object of the invention can be described as follows:

To machine coarse base material and to finish-turn the preturned blank, first the coarse base material is held in the spindle of a stationary headstock. Then the coarse base material is preturned with a first tool slide. The work preturned in this, way is thereupon picked off by a pick-off spindle and the work now sitting in the pick-off spindle is cut off with a cropper on the first tool slide. The back of the preturned work and inside diameter are machined by a second tool slide, and for finishing of the work in the outer area and on the end face it is picked up by another spindle.

By means of the arrangement of several spindles according to the invention a precise turned part of top quality can be automatically produced in one pass from coarse raw material to finishing. It goes without saying that the machine tool according to the invention is program controlled.

BRIEF DESCRIPTION OF THE DRAWINGS

The drawing shows purely schematically the arrangement of the individual assemblies of the machine tool according to the invention.

DESCRIPTION OF THE PREFERRED EMBODIMENTS

The coarse base material (cast or rolled bar or chuck parts) is first clamped in spindle 1 of stationary headstock 2 and is preturned by means of first tool slide 3 in order to prevent unbalanced masses at high rpm for the subsequent finishing. Tool slide 3, which can be made biaxial or triaxial and as a turret, can be moved in the direction of arrows 4 or 5 on base 6.

The preturned work (not shown) is picked up by pick-off spindle 7 and cut off by a cropper on first tool slide 3 or on a separate cut-off slide.

Accordingly, the back and the inside diameter of the work are machined by means of tools 8 on second tool slide 9.

Afterwards the work is picked up by spindle 10 of another headstock 11 and finishing is done in the outer area and on the end face of the work with corresponding tools 12 of tool slide 9.

Pick-off spindle 7 can be moved in the direction of arrows 13 or 14 on base 6, while headstock 11 with spindle 10 can be moved on its own base 15 in the direction of arrows 16 or 17.

Second tool slide 9 can be moved out of the chip space so that the tools can be safely changed.

All movements of the individual assemblies of the above described machine tool are program controlled in the conventional manner.

I claim:

1. A machine tool for preturning and machining a workpiece, said machine tool comprising:

a first spindle pivotably mounted on a stationary headstock to hold a coarse workpiece in a chuck;

a first tool slide for cooperating with said first spindle and having preturning tools to preturn the coarse workpiece;

a second spindle arranged to pick off the preturned workpiece directly from said first spindle;

a second tool slide for cooperating with said second spindle and having machining tools to machine the preturned workpiece; and a third spindle arranged to pick off the machined workpiece directly from said second spindle.

2. The machine tool according to claim 1, further comprising a cropper for cutting off the preturned workpiece.

3. The machine tool according to claim 1, wherein said second tool slide is movable out of a chip space.

4. The machine tool according to claim 1, further comprising a first base on which said second spindle is biaxially movable, and a second base on which said third spindle is biaxially movable.

5. The machine tool according to claim 4, wherein said first tool slide is mounted for biaxial movement on said first base.

6. The machine tool according to claim 1, wherein said second tool slide cooperates with said third spindle and has finishing tools for finishing the machined workpiece.

* * * * *